(12) United States Patent
Caceres et al.

(10) Patent No.: US 8,897,152 B1
(45) Date of Patent: Nov. 25, 2014

(54) SYSTEM AND METHOD FOR MINIMIZING NETWORK TRANSITION LATENCIES WHILE MINIMIZING POWER CONSUMPTION

(75) Inventors: Adrian D. Caceres, Los Gatos, CA (US); Vlad Troyanker, San Jose, CA (US); Jalaja C. Kurubarahalli, Milpitas, CA (US); Marc Solsona-Palomar, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 479 days.

(21) Appl. No.: 13/221,596

(22) Filed: Aug. 30, 2011

(51) Int. Cl.
H04L 12/26 (2006.01)
H04W 4/00 (2009.01)
H04W 36/30 (2009.01)

(52) U.S. Cl.
CPC ..................................... *H04W 36/30* (2013.01)
USPC .......................................... 370/252; 370/338

(58) Field of Classification Search
None
See application file for complete search history.

(56) References Cited

U.S. PATENT DOCUMENTS

| 7,477,897 B2 * | 1/2009 | Bye ............................... 455/436 |
| 2004/0224719 A1 * | 11/2004 | Nounin et al. ............. 455/553.1 |
| 2011/0182273 A1 * | 7/2011 | George et al. ................. 370/338 |

* cited by examiner

*Primary Examiner* — Afshawn Towfighi
(74) *Attorney, Agent, or Firm* — Lowenstein Sandler LLP

(57) ABSTRACT

A user device establishes a wireless connection with a wireless local area network using a first radio. The user device then deactivates a second radio of the user device based on establishing of the wireless connection with the wireless local area network. Subsequently, the user device determines whether to activate the second radio based on at least one criterion associated with the wireless connection.

28 Claims, 8 Drawing Sheets

SYSTEM AND METHOD FOR MINIMIZING NETWORK TRANSITION LATENCIES WHILE MINIMIZING POWER CONSUMPTION

BACKGROUND OF THE INVENTION

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items.

Many electronic devices include multiple radios for wirelessly communicating with different communications infrastructures. For example, mobile phones, electronic book readers, tablet computers, etc. may include a wireless local area network (WLAN) radio and a global system for mobile communication (GSM) radio. However, wireless radios consume a large amount of power relative to other components of these electronic devices, and can have a significant impact to the battery life of the electronic devices.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for enabling a user device to minimize network transition latencies while also minimizing power consumption are described herein. In one embodiment, a user device includes a wireless local area network (WLAN) module that includes a first radio and a mobile telecommunications module (e.g., second generation mobile telecommunications (2G), third generation mobile telecommunications (3G) or fourth generation mobile telecommunications (4G) module) that includes a second radio. The user device establishes a wireless connection with a wireless access point (WAP) of a wireless local area network (WLAN) using the first radio. The wireless connection may be a wireless data connection via which data packets are exchanged between the user device and the WLAN. The user device may establish the wireless connection when the WAP is detected. The user device then deactivates the second radio after establishing the wireless connection with the WAP. This may significantly reduce power consumption of the user device. However, by deactivating the second radio, the user device increases an amount of time that will be used to reestablish a connection to the mobile telecommunications network (e.g., a 2G, 3G or 4G network). Accordingly, the user device determines whether to activate the second radio based on connection criteria (or a single connection criterion) associated with the wireless connection. The criteria may include a signal strength threshold, a signal strength rate of change threshold, a packet loss rate threshold, a packet transmission rate threshold, and so on. By reactivating the second radio based on the criteria, the user device may complete a connection to the mobile telecommunications network before or shortly after the wireless connection to the WAP is lost. Therefore, the user device may minimize network transition latencies while still minimizing power consumption.

Note that embodiments of the present invention are described with reference to a user device that includes a WLAN radio and a mobile telecommunications radio. However, it should be understood that embodiments of the present invention may also apply to other user devices that include different combinations of radios (e.g., a user device that includes an LTE radio and a GSM radio). Note also that some embodiments of the present invention are described with reference to determining whether to activate a mobile telecommunications radio, while other embodiments are described with reference to determining whether to deactivate a mobile telecommunications radio. However, any of the embodiments that describe radio activation also apply to radio deactivation. Moreover, any of the embodiments that describe radio deactivation also apply to radio activation.

Figure 1:
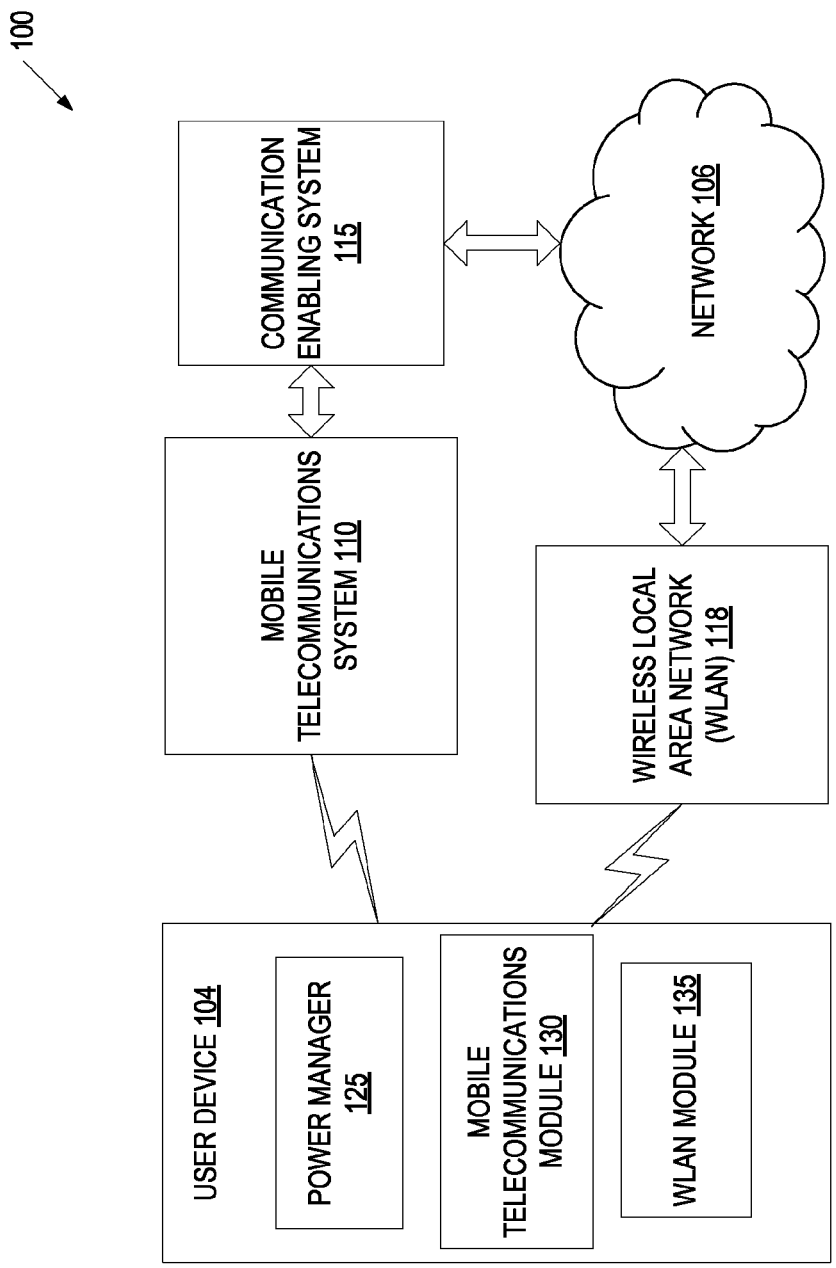
FIG. 1 is a block diagram of an exemplary network architecture.

FIG. 1 is a block diagram of an exemplary network architecture 100, in which embodiments described herein may operate. The network architecture 100 may include a user device 104 that communicates with one or more wireless communications systems (e.g., mobile telecommunications system 110 and/or wireless local area network (WLAN) 118).

User device 104 may be any type of content rendering device such as an electronic book reader, portable digital assistant, mobile phone, laptop computer, portable media player, tablet computer, camera, video camera, netbook, notebook, desktop computer, gaming console, DVD player, media center, or the like. User device 104 may include functionality to enable voice communication, data communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates.

Mobile telecommunications system 110 and WLAN 118 each provide a wireless infrastructure that enables the user device 104 to communicate with a network 106. Network 106 may be a packet switched domain network (e.g. the Internet or a local area network (LAN)) or may be a circuit switched domain network (e.g., a public switched telephone network (PSTN)). Mobile telecommunications system 110 and WLAN 118 may additionally enable the user device 104 to communicate with multiple different networks (e.g., with both a PSTN and the Internet).

The mobile telecommunications system 110 may be a 2G, 3G or 4G wireless communication network. For example, the mobile telecommunications system 110 may be a Global System for Mobile Communication (GSM) network, an Interim Standard 95 (IS-95) network, a Universal Mobile Telecommunications System (UMTS) network, a Code Division Multiple Access 2000 (CDMA2000) network, a long term evolution (LTE) network, a WiMax network, or other wireless network. Mobile telecommunications system 110 includes multiple cells (not shown) arranged over a geographic area, each of which is assigned a set of frequencies to use for radio communications. Each cell has a coverage area, and handles communications with user devices 104 in that area. Mobile telecommunications system 110 may additionally include base station subsystems (BSS) (not shown), mobile switching centers (MSC) (not shown), and/or other components. Alternatively, or in addition, the mobile telecommunications system 110 may rely on satellite technology to exchange information with the user device 104.

In one embodiment, mobile telecommunications system 110 is connected to a communication-enabling system 115 that serves as an intermediary in passing information between one or more servers connected to the network 106 and the mobile telecommunications system 110. The communication-enabling system 115 may communicate with the mobile telecommunications system 110 via a dedicated channel, and may communicate with the servers via a non-dedicated communication mechanism, e.g., a public Wide Area Network (WAN) such as the Internet.

WLAN 118 provides a connection to network 106 through a wireless access point (WAP) (not shown) or multiple WAPs. WLAN 118 may additionally include switches, routers, gateways, modems, or other components. In one embodiment, WLAN 118 includes one or more WiFi WAPs (known as hotspots), and is based on IEEE 802.11 standards. Alternatively, or in addition, WLAN 118 may include WAPs that communication using Super WiFi or other wireless communication technologies.

User device 104 includes a mobile telecommunications module 130 that enables the user device to communicate with mobile telecommunications system 110. The mobile telecommunications module 130 includes a mobile telecommunications radio that is configured to establish and maintain wireless connections with the mobile telecommunications system 110 via one or multiple wireless communications standards, such as GSM, IS-95, UMTS, CDMA2000, LTE, WiMAX, and so forth.

User device 104 further includes a WLAN module 135 that enables the user device 104 to communicate with WLAN 118. The WLAN module 135 includes a WLAN radio that is configured to establish and maintain wireless connections with WLAN 118 using WiFi, Super WiFi, Bluetooth or other wireless communication standards. Although illustrated as separate modules, the functionality of mobile telecommunications module 130 and WLAN module 135 may be integrated into a single device having two or more radios (whether dedicated or software configurable).

Both the mobile telecommunications module 130 (and specifically the mobile telecommunications radio) and the WLAN module 135 (and specifically the WLAN radio) consume a large percentage of the user device's 104 power. In embodiments in which the user device 104 is a battery operated device (e.g., a mobile phone, electronic book reader, notebook computer, etc.), the mobile telecommunications module 130 and WLAN module 135 can cause the battery life of the user device 104 to be significantly diminished. Accordingly, user device 104 includes a power manager 125 that may control the distribution of power to the mobile telecommunications module 130 and the WLAN module 135.

Power manager 125 may activate and/or deactivate various components of the user device 104. In one embodiment, power manager 125 is configured to activate and deactivate radios of the user device 104. Specifically, power manager 125 may apply one or more power management rules to determine when to power on the mobile telecommunications module 130, when to power off the mobile telecommunications module 130, when to power on the WLAN module 135 and/or when to power off the WLAN module 135. The Power manager 125 is discussed in greater detail below with reference to FIG. 2.

Figure 2:
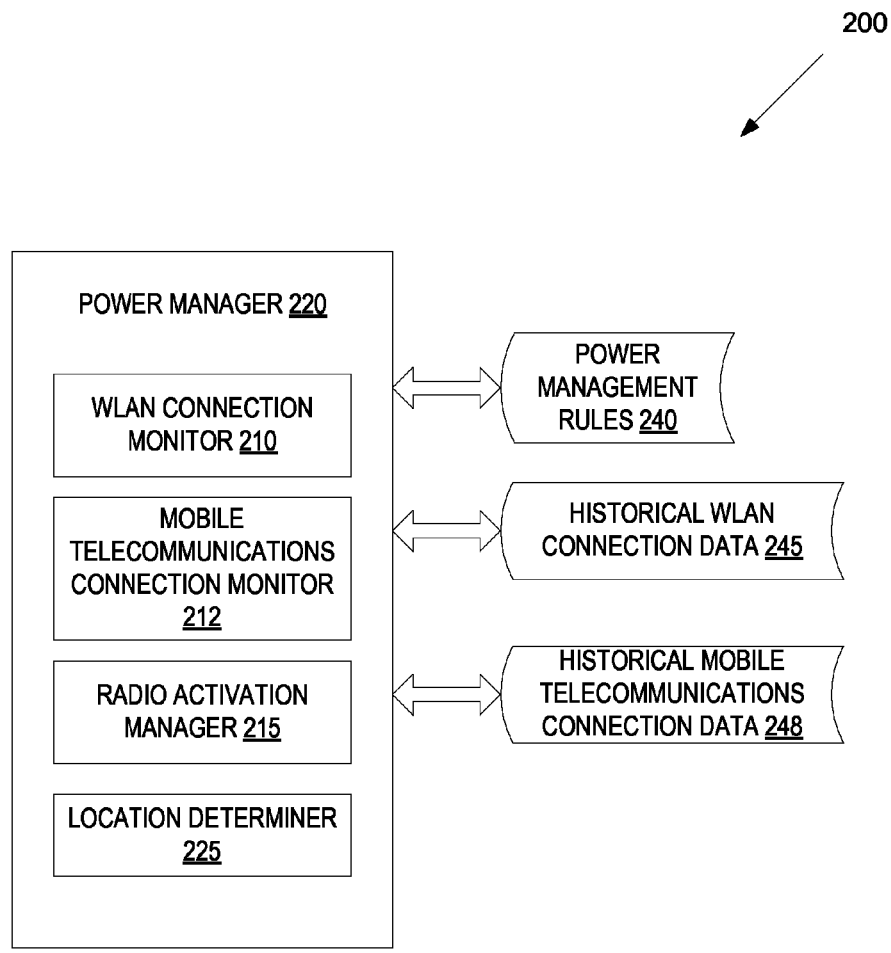
FIG. 2 is a block diagram of one embodiment of a power manager.

FIG. 2 is a block diagram of one embodiment of a power manager 200, which may correspond to the power manager 125 of FIG. 1. In one embodiment, the power manager 200 includes a WLAN connection monitor 210, a mobile telecommunications connection monitor 212, a radio activation manager 215 and a location determiner 225. The power manager 220 may be a component of a user device.

The WLAN connection monitor 210 may detect available WLAN networks, metrics associated with the WLAN networks, and/or a connection status of the user device with any WLAN networks. Additionally, the WLAN connection monitor 210 may measure metrics associated with an active connection to a WLAN network, and determine a signal quality there from. The user device may be configured to automatically establish a wireless connection to available WLAN networks that the user device detects. Alternatively, the user device may connect to WLAN devices upon receiving a user command.

Monitoring the metrics associated with available WLAN networks may include determining a signal strength for signals from a WAP or WAPs of some or all available WLAN networks. The signal strength represents the strength of signals received by the user device from the WAPs. The signal strength may be determined from a periodic transmission of a packet (called a beacon) generated by each WAP of a WLAN. Accordingly, the signal strength metric may be frequently updated based on the beacon. In one embodiment, signal strength is measured in dBm. In one embodiment, the signal strength is divided into bars, where an increased number of bars represents a stronger signal. In one embodiment, a signal strength of −80 dBm to −100 dBm is translated to 1 bar, a signal strength of −74 dBm to −80 dBm is translated to 2 bars, a signal strength of −70 dBm to −74 dBm is translated to 3 bars, a signal strength of −55 dBm to −70 dBm is translated to 4 bars and a signal strength of +15 dBm to +5 dBm is translated to 5 bars. However, signal strengths may also be divided into bars on other boundaries.

In addition to detecting signal strength, WLAN connection monitor 210 may detect other metrics associated with a connection to a WLAN. In one embodiment, WLAN connection monitor measures a packet transmission rate. The packet transmission rate may be assigned to the user device by the WAP based, among other factors, on the signal strength of signals sent from the user device to the WAP. The packet transmission rate is a good indicator of the strength of signals received by the WLAN from the user device. However, the packet transmission rate may become stale if the user device has not transmitted any packets to the WLAN for a period of time.

In one embodiment, the WLAN connection monitor 210 measures a packet loss rate and/or a packet error rate. The packet loss rate indicates a number of packets that are sent by the user device but not received by the WAP. Accordingly, the packet loss rate can be a good indicator of a quality of a signal between the user device and the WAP. The Packet error rate can provide similar information.

In one embodiment, the WLAN connection monitor 210 computes rates of changes and/or directions of changes of one or more of the above described metrics. For example, the WLAN connection monitor 210 may compute a rate of change of the signal strength and a direction of change of the signal strength. Therefore, the WLAN connection monitor 210 may determine not only a current signal strength, but also whether the signal strength is improving or degrading and the rate at which the signal strength is improving or degrading. In one embodiment, the WLAN connection monitor 210 determines the rate of change and direction of change of a metric based on taking a derivative of the metric with relation to time. Additionally, the WLAN connection monitor 210 may compute a second derivative of one or more metrics to determine how the rate of change of a metric is itself changing.

In one embodiment, WLAN connection monitor 210 determines whether the user device has an active connection to a network (e.g., to the Internet). This may be performed by determining whether the user device has been assigned an internet protocol (IP) address and by issuing a domain name service (DNS) request to a server on the network. If the server responds to the DNS request, then WLAN connection monitor 210 determines that the user device has an active connection to the network. If the user device has not been assigned an IP address, or does not receive a response to the DNS request, then the WLAN connection monitor 210 determines that the user device does not have a connection to the network.

In one embodiment, WLAN connection monitor 210 records historical WLAN connection data 245. The historical WLAN connection data 245 may include information on which WLANs the user device has successfully connected to, geographic locations of WLANs that the user device has successfully connected to, connection duration to the WLANs, connection patterns, signal strengths or other metrics measured when the user device lost a connection to a WLAN, and so forth. This information may be used by the radio activation manager 215 along with WLAN connection information to determine when to activate and/or deactivate one or more radios of the user device.

Mobile telecommunications connection monitor 212 records historical connection information for connections to a mobile telecommunications system. In one embodiment, entries in the historical mobile telecommunications connection data 248 are associated with location information that is determined by location determiner 225. The historical mobile telecommunications connection data 248 may be used to determine average connection times to establish connections to the mobile telecommunications system at different locations. For example, based on the historical mobile telecommunications connection data 248, the mobile telecommunications connection monitor 212 may determine that it takes approximately 3 seconds to establish a connection with the wireless carrier at a user's home, and that it takes approximately 1 second to establish a connection with the wireless carrier at the user's work. Additionally, the connection data 248 may identify average signal strength to the wireless carrier at specific locations, average connection durations and/or other historical information.

In one embodiment, the power manager 220 includes a location determiner 225. Alternatively, the location determiner 225 may be a separate module of the user device that communicates with power manager 220. The location determiner 225 may determine a current location of the user device based on a global positioning system (GPS) signal received by a GPS receiver included in the user device. The location determiner 225 may also determine a current location of the user device based on triangulation of multiple cell towers of the mobile telecommunications system. Alternatively, the location determiner 225 may determine a current location of the user device based on one or multiple WLANs that the user device detects and/or based on a WLAN that the user device has a connection to. The location information may be added to historical connection data 245 and/or to historical mobile telecommunications connection data 248. Additionally, the location information may be used by radio activation manager 215 to determine when to activate and/or deactivate a radio or radios.

Radio activation manager 215 determines when to activate and/or deactivate a mobile telecommunications radio (or a module that includes a mobile telecommunications radio). Radio activation manager 215 may also determine when to activate and/or deactivate a WLAN radio (or a module that includes a WLAN radio). Radio activation manager 215 may also determine when to activate and/or deactivate additional radios, such as a Bluetooth radio. By controlling the activation status of one or more radios, the radio activation manager 215 may minimize a lag experienced by a user during a network transition, while at the same time minimizing power consumption of the user device. In one embodiment, as a quality of a connection to a WLAN drops, the radio activation manager 215 activates the mobile telecommunications radio to minimize lag caused by a transition between the WLAN and a mobile telecommunications system. For example, a lag of 20-60 seconds may be reduced all the way to 0 seconds.

In one embodiment, radio activation manager 215 determines when to activate/deactivate a radio based on power management rules 240. The radio activation manager 215 may activate a mobile telecommunications radio when a criterion or criteria of a first power management rule 240 is/are satisfied. After the mobile telecommunications radio is activated, the user device may use the mobile telecommunications radio to send and receive data rather than the WLAN radio. The mobile telecommunications radio may be activated during an active connection through a WLAN network to an endpoint (e.g., another user device, a web server, etc.). In such an instance, the active connection to the endpoint may be transferred to a mobile telecommunications system. The radio activation manager 215 may additionally deactivate the mobile telecommunications radio when a criterion or criteria of a second power management rule 240 is/are satisfied. After the mobile telecommunication radio is deactivated, all data will be sent and received using the WLAN radio. Note that the mobile telecommunications radio may be deactivated while the user device has an active connection to an endpoint through a mobile telecommunications system. If the user device has such an active connection, then preferably prior to deactivation of the mobile telecommunications radio the active connection between the user device and the endpoint is transferred to the WLAN. However, the connection may also be transferred after deactivation of the mobile telecommunications radio.

In one embodiment, radio activation manager 215 deactivates the mobile telecommunications radio if the user device establishes a connection to a WLAN and to a network (e.g., the Internet) via the WLAN. In a further embodiment, radio activation manager 215 deactivates the mobile telecommunications radio after the user device is connected to the Internet via a WLAN if a metric associated with a wireless connection to the WLAN satisfies a threshold. For example, radio activation manager 215 may deactivate the mobile telecommunications radio if a signal strength for a WAP of the WLAN satisfies an upper signal strength threshold. In one embodiment, the upper signal strength threshold is 5 bars (as explained above) or +5 dBm. Alternatively, other upper signal strength thresholds may be used. In addition to, or instead of, using a signal strength threshold to determine whether to deactivate the mobile telecommunications radio, radio activation manager may use a packet transmission rate threshold, a packet loss rate threshold, and/or other criteria. Any of the criteria described below with reference to determining when to activate the mobile telecommunications radio may also be used to determine when to deactivate the mobile telecommunications radio.

In one embodiment, radio activation manager 215 activates the mobile telecommunications radio if a signal strength of a WLAN to which the user device is connected drops below a lower signal strength threshold. The lower signal strength threshold may be, for example, 2 bars or −80 dBm. Other metrics associated with the connection to the WLAN may also be used in addition to, or instead of, the signal strength to determine when to activate the mobile telecommunications radio. For example, the radio activation manager 215 may activate the mobile telecommunications radio if a packet transmission rate drops below a packet transmission rate threshold, if a packet loss rate rises above a packet loss rate threshold and/or if a packet error rate rises above a packet error rate threshold.

In one embodiment, radio activation manager 215 uses information on the first derivative and/or second derivative (or mathematically similar values that are obtained without actually computing derivatives) of signal strength and/or additional metrics to determine when to activate or deactivate the mobile telecommunications radio. For example, a power management rule 240 may specify to activate the mobile telecommunications radio if the signal strength drops below a lower signal strength threshold unless a signal strength degradation is decelerating or the signal strength is improving. Another power management rule 240 may specify to activate the mobile telecommunications radio if a) the signal strength drops below a first lower threshold (e.g., 2 bars); or if b) the signal strength drops below a second lower threshold (e.g., 3 bars) that is higher than the first lower threshold and the signal strength is degrading faster than a signal strength rate of change threshold.

In one embodiment, radio activation manager 215 uses historical WLAN connection data 245 and/or data on currently detected WLANs to determine whether to activate the mobile telecommunications radio. For example, a power management rule 240 may specify to activate the mobile telecommunications radio if the signal strength to a WLAN that the user device is connected to drops below a signal strength threshold unless an additional WLAN is detected that has a signal strength that at least meets the signal strength threshold. In one embodiment, the additional WLAN should be a WLAN that the user device has successfully connected to in the past and/or that the user device has successfully used to connect to the Internet, as indicated in the historical WLAN connection data 245. In another example, a power management rule 240 may apply different signal strength thresholds depending on a difference between an amount of time that the user device has remained connected to the WLAN and an amount of time that the user device historically remains connected to the WLAN. For example, if the user device usually remains connected to the WLAN for approximately 30 minutes, then a first threshold of 2 bars may be applied if the user device has been connected to the WLAN for 10 minutes and a second threshold of 3 bars may be applied if the user device has been connected to the WLAN for 40 minutes.

In one embodiment, radio activation manager 215 uses historical mobile telecommunications data 248 to determine whether to activate the mobile telecommunications radio. For example, the connection data 248 may indicate the connection setup time for establishing a wireless connection to a mobile telecommunications system associated with a current location of the user device. A power management rule 240 may specify different signal strength thresholds associated with different connection setup times. For example, a signal strength threshold of 3 bars may apply if the connection setup time is 13 seconds, and a signal strength threshold of 2 bars may apply if the connection setup time is 6 seconds.

The mobile telecommunications radio may have multiple stages of activation. When the radio is fully activated (highest level of activation), the radio can transmit and receive radio signals. When the radio is fully deactivated (completely powered off), the radio does not consume any power. However, it may take time (e.g., 30 seconds) to transition the radio from the fully deactivated state to the fully activated state. Accordingly, in one embodiment, the radio activation manager 215 places the radio into a partially deactivated state. While the radio is in the partially deactivated state, some components of the radio remain under power. It can take less time to transition the radio from the partially deactivated state to the fully active state than to transition the radio from the partially deactivated state to the fully active state. For example, it may take around 10 seconds to transition from the partially deactivated state to the fully active state.

In one embodiment, the radio activation manager 215 powers down (deactivates) and powers on (activates) the mobile telecommunications radio in stages. Each of the stages may be associated with different power management rules that include different criteria. For example, a first power management rule 240 may specify to transition the radio from a fully deactivated state into a partially deactivated state when the signal strength for a WLAN to which the user device is connected decreases to 3 bars. A second power management rule 240 may additionally specify to transition the radio from the partially deactivated state to a fully active state when the signal strength for the WLAN decreases to 1 bar.

Figure 3:
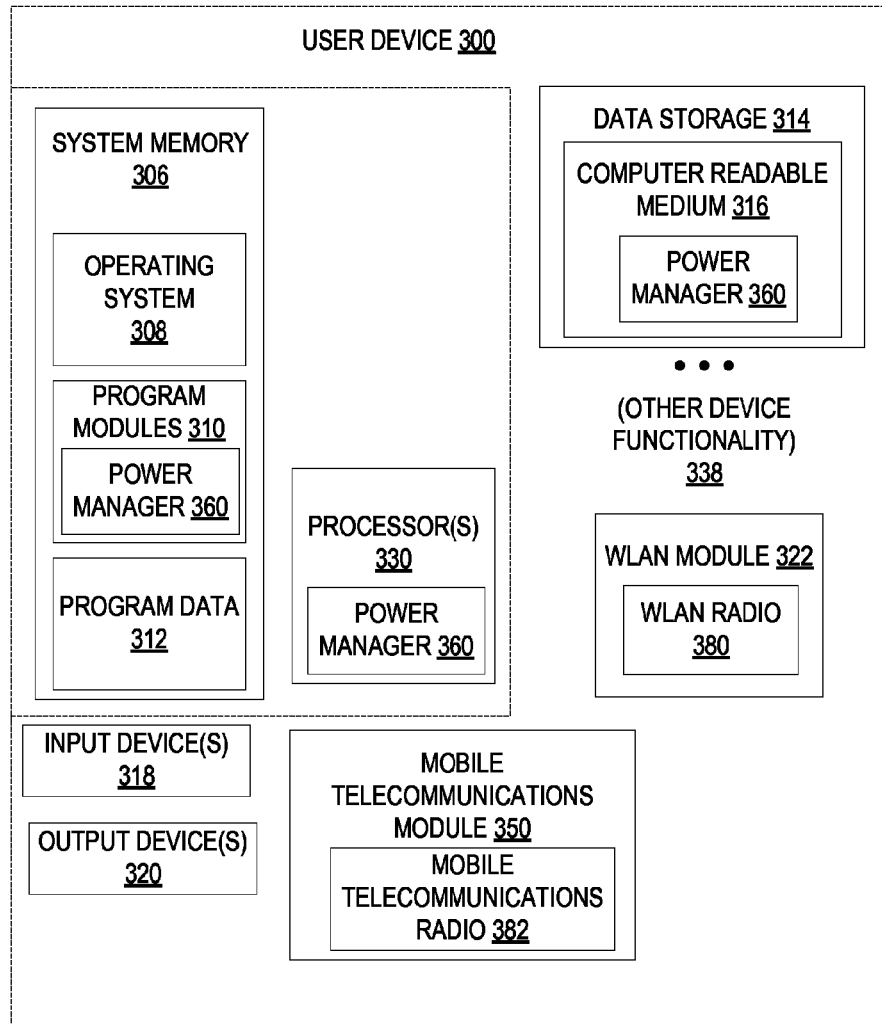
FIG. 3 is a block diagram illustrating an exemplary user device.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as power manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the power manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a mobile telecommunications module 350 that has a mobile telecommunications radio 382 for communicating with a mobile telecommunications system. The mobile telecommunications module 350 may allow the user device 300 to handle both voice and non-voice communications (such as communications for text messages, multimedia messages, media downloads, web browsing, etc.) with the mobile telecommunications system 110. The mobile telecommunications module 350 may provide network connectivity using any type of mobile telecommunications technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), LTE, WiMax, etc. The mobile telecommunications module 350 (including the mobile telecommunications radio 382) may be powered on or off by the power manager 360.

The user device 300 further includes a WLAN module 322 that has a WLAN radio 380 for communicating with a WLAN. The WLAN module 322 (including the WLAN radio 380) may be powered on or off by the power manager 360.

FIGS. 4-8 are flow diagrams of some embodiments of methods performed by a user device. The methods are performed by processing logic that may comprise hardware (circuitry, dedicated logic, etc.), software (such as is run on a general purpose computer system or a dedicated machine), or a combination of both. In one embodiment, at least some operations of the methods are performed by a power manager 200, as described in FIG. 2.

Figure 4:
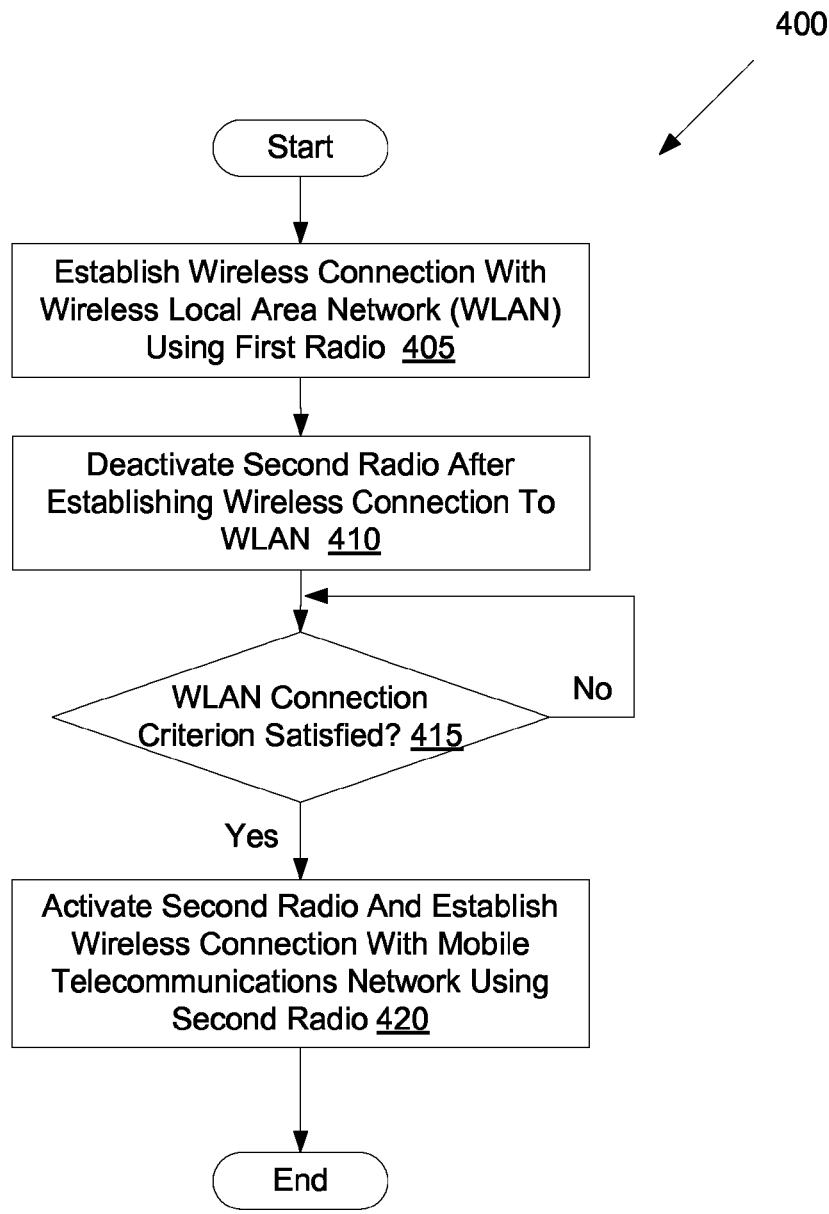
FIG. 4 is a flow diagram of an embodiment for a method of managing power to a mobile telecommunications radio.

FIG. 4 is a flow diagram of an embodiment for a method 400 of managing power to a mobile telecommunications radio. At block 405, processing logic establishes a wireless connection with a wireless local area network (WLAN) using a first radio. The first radio may be a WLAN radio (e.g., a WiFi radio). At block 410, the user device deactivates a second radio. The second radio is preferably deactivated after establishing the wireless connection to the WLAN, but may also be deactivated based on other criteria. Deactivating the second radio may mean completely powering off the second radio or placing the second radio into a partially deactivated state. The second radio may be a mobile telecommunications radio, such as an LTE radio, GSM radio, and so forth.

At block 415, processing logic determines whether a WLAN connection criterion is satisfied. The WLAN connection criterion may be specified in a power management rule. Examples of a WLAN connection criterion include a signal strength threshold, a packet transmission rate threshold and a packet loss rate threshold. For example, a WLAN connection criterion may be satisfied if a signal strength associated with the connection to the WLAN network via the first radio falls below a signal strength threshold. In another example, a WLAN connection criterion may be satisfied if a packet loss rate associated with the connection to the WLAN network falls below a packet loss rate threshold. In another example, a WLAN connection criterion may be satisfied if an error associated with the first radio is detected. If the WLAN connection criterion is satisfied, the method continues to block 420. Otherwise, the method returns to block 415, and again determines whether any WLAN connection criterion has been satisfied. This may continue while the user device is powered on or until a user manually sets the second radio to an off state.

At block 420, processing logic activates the second radio and establishes a wireless connection with a mobile telecommunications network. Therefore, a voice connection or data connection that the user device originally had active via the WLAN may be transferred to the mobile telecommunications network without interruption when a connection to the WLAN is terminated. After the second radio establishes the wireless connection with the mobile telecommunications network (and any active connections are transferred to this connection), processing logic may continue to monitor for signals from WLAN networks. In one embodiment, processing logic transitions to a mode to determine whether the second radio should be deactivated, as specified with reference to FIG. 8.

Figure 5:
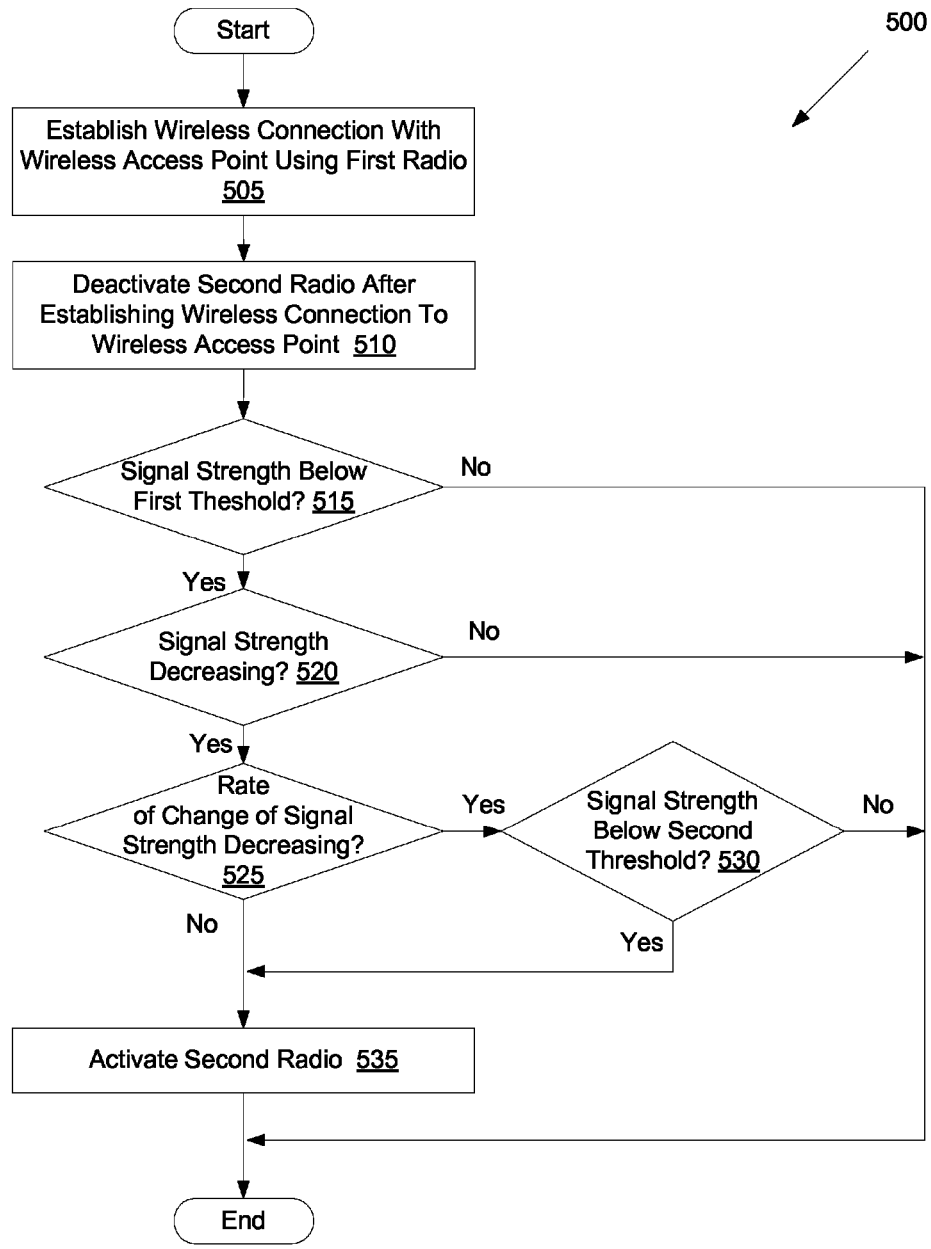
FIG. 5 is a flow diagram of another embodiment for a method of managing power to a mobile telecommunications radio.

FIG. 5 is a flow diagram of another embodiment for a method 500 of managing power to a mobile telecommunications radio. At block 505, processing logic establishes a wireless connection with a wireless local area network (WLAN) using a first radio. This may include, for example, identifying a WLAN having at least a threshold signal strength, selecting the WLAN, and providing a password to the WLAN. At block 510, processing logic deactivates a second radio after establishing the wireless connection to the WLAN. Alternatively, processing logic may deactivate the second radio prior to establishing the wireless connection to the WLAN. The second radio may be deactivated when a first criterion is satisfied (e.g., when a signal strength to the WLAN reaches an upper threshold).

At block 515, processing logic determines whether a signal strength for the WLAN drops below a first signal strength threshold. If the signal strength drops below the first signal strength threshold, the method continues to block 520. Otherwise, the method ends. Alternatively, the method may return to block 515, to again check whether the signal strength has dropped below the first threshold.

At block 520, processing logic determines whether the signal strength is decreasing. In one embodiment, processing logic makes this determination by computing a first derivative of the signal strength. If the signal strength is decreasing, the method continues to block 525. If the signal strength is not decreasing, the method ends. Alternatively, the method may return to block 520, to again check whether the signal strength is decreasing.

At block 525, processing logic determines whether a rate of change of the signal strength is decreasing. In one embodiment, processing logic makes this determination by computing a second derivative of the signal strength. If the rate of change of the signal strength is not decreasing, the method continues to block 535, and processing logic activates the second radio. If the rate of change of the signal strength is decreasing, the method proceeds to block 530.

At block 530, processing logic determines whether the signal strength has dropped below a second signal strength threshold. The second signal strength threshold may be lower than the first signal strength threshold. If the signal strength has dropped below the second signal strength threshold, the method continues to block 535, and the second radio is activated. Otherwise, the method ends. Alternatively, the method may return to block 530, to again check whether the signal strength has dropped below the second threshold.

Figure 6:
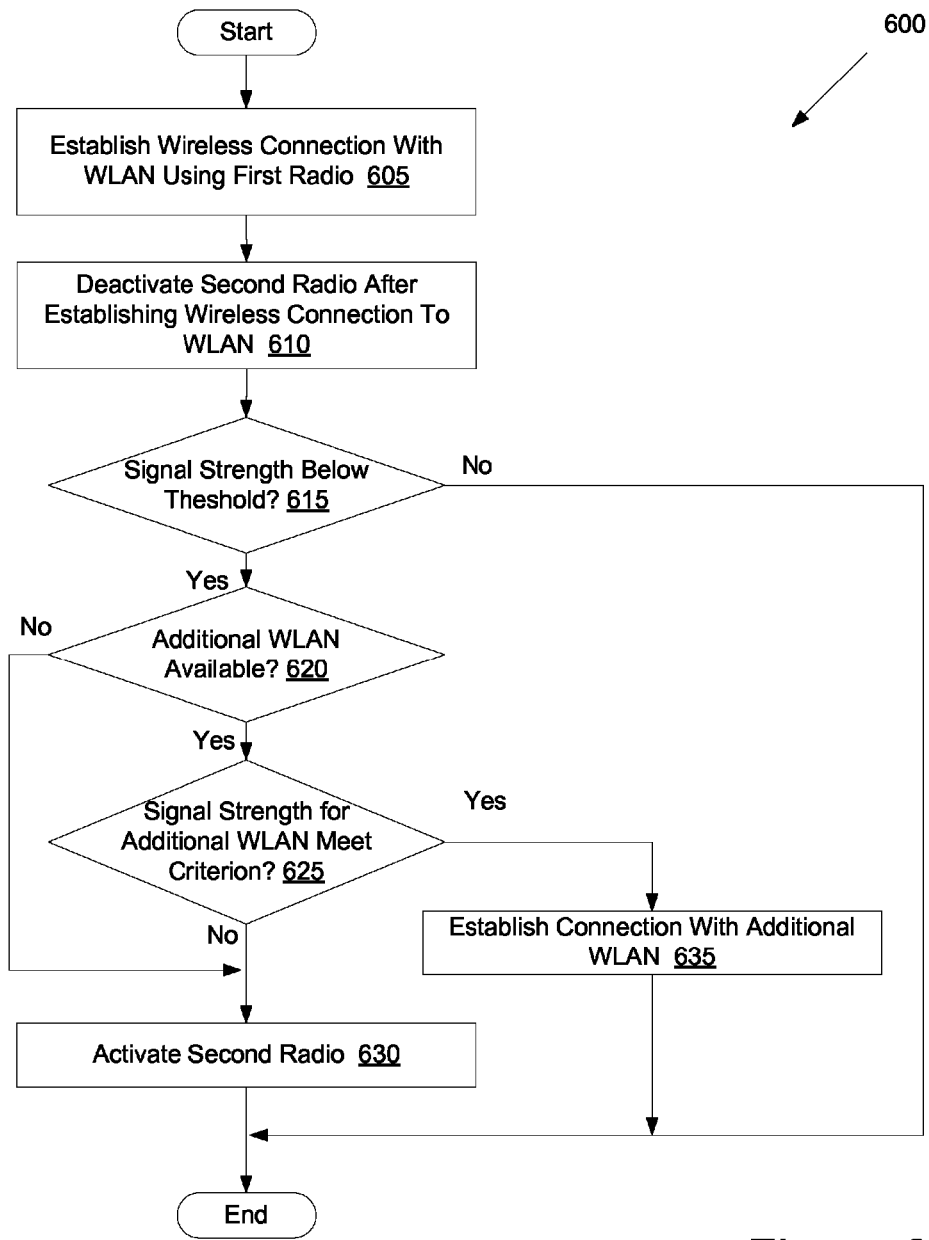
FIG. 6 is a flow diagram of yet another embodiment for a method of managing power to a mobile telecommunications radio.

FIG. 6 is a flow diagram of yet another embodiment for a method 600 of managing power to a mobile telecommunications radio. At block 605, processing logic establishes a wireless connection with a WLAN using a first radio. At block 610, processing logic deactivates a second radio before, during, or after establishing the wireless connection to the WLAN.

At block 615, processing logic determines whether signal strength for the WLAN has dropped below a signal strength threshold. If the signal strength has dropped below the signal strength threshold, the method continues to block 620. Otherwise, the method ends.

At block 620, processing logic determines whether an additional WLAN is available. In one embodiment, processing logic determines whether an additional WLAN that the processing logic is able to establish a connection with is available. Such a WLAN may be a WLAN to which processing logic has connected in the past, an encrypted WLAN that the processing logic holds a password to and/or a WLAN that is not encrypted. If an additional WLAN is available, the method continues to block 625. Otherwise, the method proceeds to block 630.

At block 625, processing logic determines whether a signal strength for the additional WLAN meets a criterion. In one embodiment, processing logic determines whether the signal strength meets or exceeds the signal strength threshold and/or whether the signal strength is increasing. If the signal strength for the additional WLAN meets the criterion, the method proceeds to block 635, at which the user device establishes a connection to the additional WLAN. If the signal strength for the additional WLAN fails to meet the criterion, the method continues to block 630, at which processing logic activates the second radio. The method then ends.

Figure 7:
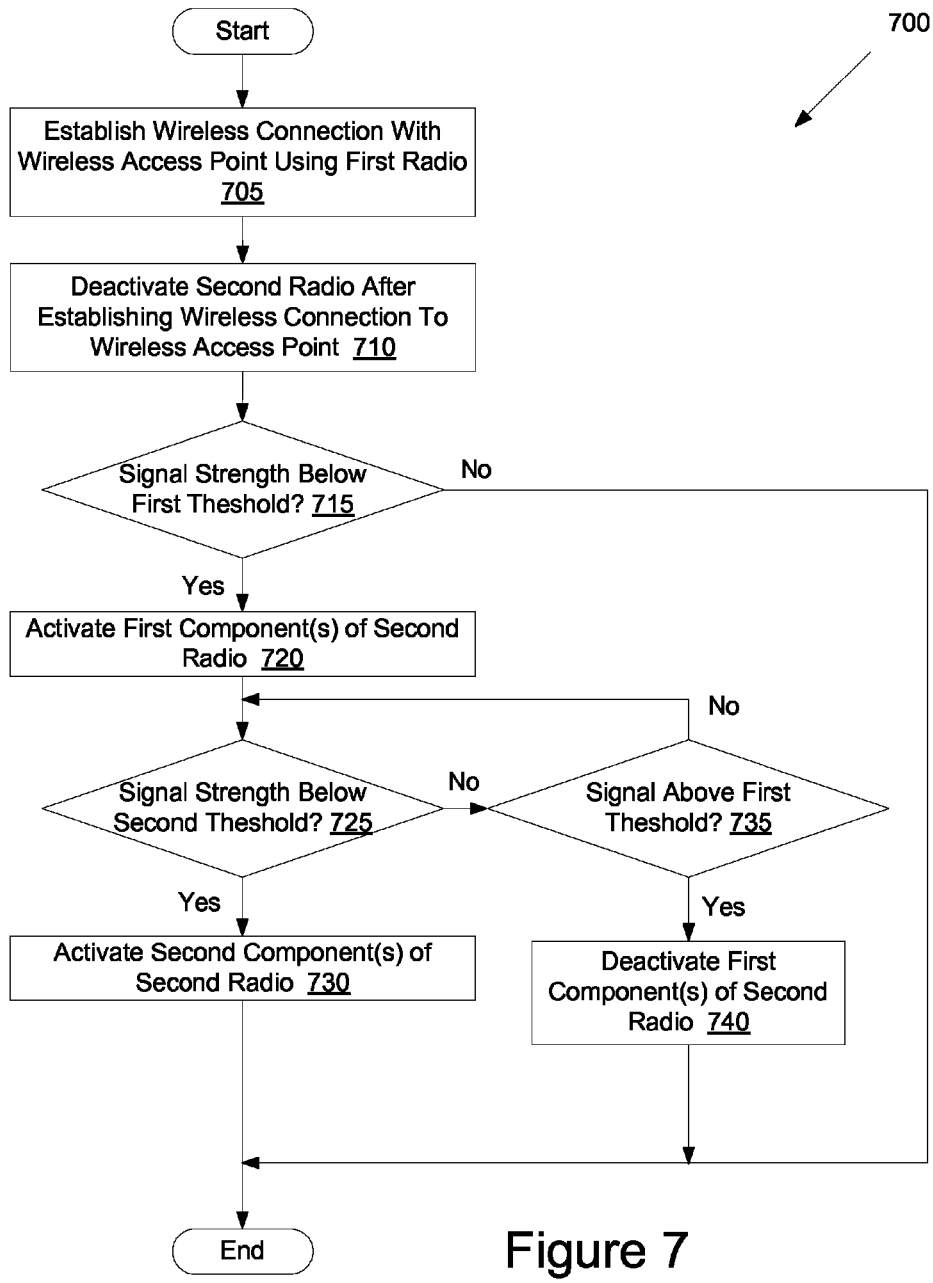
FIG. 7 is a flow diagram of still yet another embodiment for a method of managing power to a mobile telecommunications radio.

FIG. 7 is a flow diagram of still yet another embodiment for a method 700 of managing power to a mobile telecommunications radio. At block 705, processing logic establishes a wireless connection with a wireless local area network (WLAN) using a first radio. At block 710, processing logic deactivates a second radio. Deactivating the second radio may include completely powering down the second radio.

At block 715, processing logic determines whether signal strength for the WLAN has dropped below a first signal strength threshold. If the signal strength has dropped below the first signal strength threshold, the method continues to block 720. Otherwise, the method ends.

At block 720, processing logic activates a first component (or components) of the second radio. By activating the first component of the second radio, the processing logic places the second radio into a partially deactivated state.

At block 725, processing logic determines whether the signal strength has dropped below a second signal strength threshold that is lower than the first signal strength threshold. If the signal strength drops below the second signal strength threshold, the method continues to block 730. Otherwise, the method proceeds to block 735.

At block 730, processing logic activates a second component (or components) of the second radio. This may place the second radio into a fully active state.

At block 735, processing logic determines whether the signal strength has increased above the first signal strength threshold. If the signal strength has raised above the first signal strength threshold, the method proceeds to block 740, and processing logic deactivates the first component to place the second radio back into a fully deactivated state. If the signal strength has risen above the first signal strength threshold, the method returns to block 725.

Figure 8:
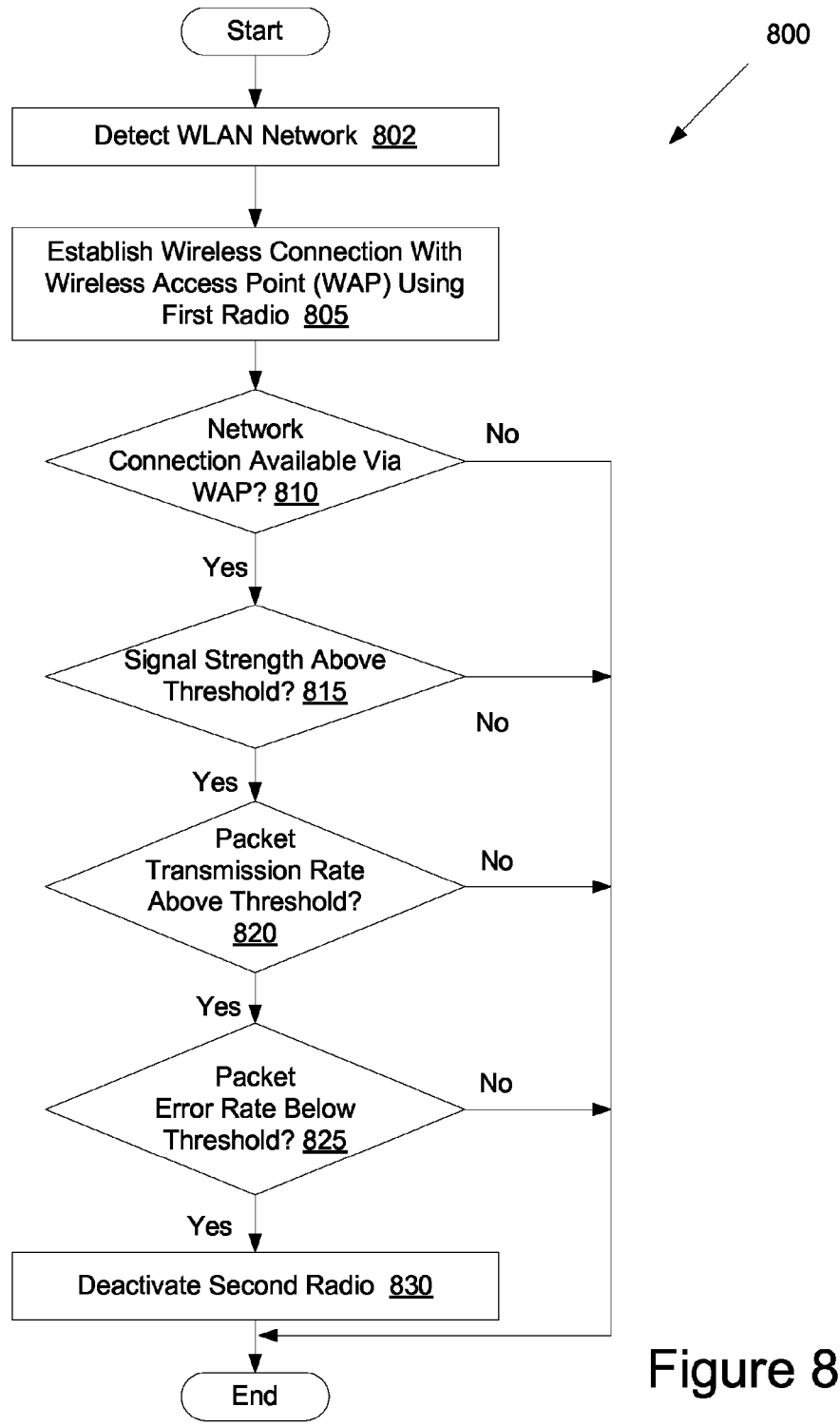
FIG. 8 is a flow diagram of one embodiment for a method of determining when to deactivate a mobile telecommunications radio.

FIG. 8 is a flow diagram of one embodiment for a method of determining when to deactivate a mobile telecommunications radio of a user device. At block 802, processing logic detects a WLAN network. The WLAN network may be a WLAN network to which the user device has previously connected, a public WLAN network, or a private WLAN network for which the user device holds a password. At block 805, processing logic establishes a wireless connection with the WLAN using a first radio. The first radio may be a WLAN radio (e.g., a WiFi radio).

At block 810, processing logic determines whether there is a network connection (e.g., to the Internet) available via the wireless connection to the WLAN. This may include determining whether the user device has been assigned a valid IP address and/or sending a DNS request to a known server and receiving a response to the DNS request. If a network connection is available, then the method continues to block 815. Otherwise, the method ends.

At block 815, processing logic determines whether a signal strength for signals from the WLAN are above a signal strength threshold. If the signals have a signal strength above the signal strength threshold, the method continues to block 815. Otherwise, the method ends.

At block 820, processing logic determines whether a packet transmission rate for the connection to the WLAN are above a packet transmission rate threshold. If the connection has a packet transmission rate above the packet transmission rate threshold, the method continues to block 825. Otherwise, the method ends.

At block 825, processing logic determines whether a packet error rate for the connection to the WLAN is below a packet error rate threshold. If the connection has a packet error rate that is below the packet error rate threshold, the method continues to block 830 and processing logic deactivates a second radio (e.g., a mobile telecommunications radio). Deactivating the second radio may include fully powering the second radio off, or placing the second radio into a low power consumption state (e.g., a partially powered state). Otherwise, the method ends.

Note that in alternative embodiments, one or more of blocks 810-815 may be omitted. Additionally, other connection criteria than those listed with reference to method 800 may be used to determine whether to deactivate the second radio.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "establishing", "deactivating", "determining", "activating", "computing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   establishing, by a user device and using a first radio, a wireless data connection with a wireless access point, wherein the user device comprises a second radio in a powered-up state;
   placing the second radio of the user device into a powered-down state responsive to establishing the wireless data connection with the wireless access point;
   determining a signal strength for a signal from the wireless access point;
   determining whether to place the second radio into the powered-up state based on the signal strength; and
   placing the second radio into the powered-up state based at least in part on a determination that the signal strength is below a signal threshold, wherein placing the second radio into the powered-up state comprises supplying power to the second radio without transferring the wireless data connection to the second radio.

2. The method of claim 1, further comprising:
   computing a rate of change of the signal strength;
   computing a direction of change of the signal strength; and
   placing the second radio into the powered-up state if the signal strength is decreasing and the rate of change exceeds a signal strength rate of change threshold.

3. The method of claim 1, further comprising:
   determining at least one of a packet loss rate for the wireless data connection, a packet error rate for the wireless data connection or a packet transmission rate for the wireless data connection; and
   placing the second radio into the powered-up state in response to one or more of determining that the packet loss rate is greater than a packet loss rate threshold, determining that the packet error rate is greater than a packet error rate threshold, or determining that the packet transmission rate is less than a packet transmission rate threshold.

4. The method of claim 1, further comprising:
   determining, based on historical data, a historical connection time duration for wireless data connections to the wireless access point;
   determining a duration that the user device has been connected to the wireless access point; and
   determining whether to place the second radio into the powered-up state based on a comparison between the determined duration and the historical connection time duration.

5. The method of claim 1, further comprising:
   determining a historical connection setup time for connections by the second radio to a mobile telecommunications network at a current location of the user device; and
   determining when to place the second radio into the powered-up state based on the historical connection setup time and the signal strength.

6. The method of claim 1, further comprising:
   enabling a first component of the second radio in response to a first criterion being satisfied to place the second radio into a partially powered state; and
   enabling a second component of the second radio in response to a second criterion being satisfied to place the second radio into a fully powered state.

7. The method of claim 1, wherein the powered-down state comprises a partially powered state, the method further comprising:
   ceasing transmissions by the second radio.

8. The method of claim 1, wherein placing the second radio of the user device into the powered-down state responsive to establishing the wireless data connection with the wireless access point comprises:
   determining whether a connection criterion associated with the wireless data connection with the wireless access point is satisfied; and
   placing the second radio into the powered-down state in response to determining that the connection criterion is satisfied.

9. The method of claim 1, wherein the powered-down state is an unpowered state.

10. The method of claim 1, further comprising:
    transferring the wireless data connection to the second radio after placing the second radio into the powered-up state.

11. A user device comprising:
a wireless local area network (WLAN) radio;
a mobile telecommunications radio; and
a processing device, coupled to the WLAN radio and the mobile telecommunications radio, wherein the processing device is configured to:
establish a wireless connection with a WLAN using the WLAN radio;
place the mobile telecommunications radio into a powered-down state based on establishment of the wireless connection with the WLAN;
determine whether at least one criterion associated with the wireless connection is satisfied; and
place the mobile telecommunications radio into a powered-up state responsive to a determination that the at least one criterion is satisfied, wherein placing the mobile telecommunications radio into the powered-up state comprises supplying power to the mobile telecommunications radio without transferring the wireless connection to the mobile telecommunications radio.

12. The user device of claim 11, wherein the at least one criterion comprises a signal strength threshold, and wherein the processing device is further configured to:
transfer the wireless connection to the second radio after placing the second radio into the powered-up state.

13. The user device of claim 12, wherein the at least one criterion further comprises a signal strength rate of change threshold, and wherein the processing device is further configured to:
compute a rate of change of the signal strength;
compute a direction of change of the signal strength; and
place the mobile telecommunications radio into the powered-up state if the signal strength is decreasing and the rate of change exceeds a signal strength rate of change threshold.

14. The user device of claim 11, wherein the at least one criterion includes at least one of a packet loss rate threshold or a packet transmission rate threshold, and wherein the processing device is further configured to:
determine at least one of a packet loss rate for the connection or a packet transmission rate for the connection; and
place the mobile telecommunications radio into the powered-up state in response to one or more of determining that the packet loss rate is greater than a packet loss rate threshold or determining that the packet transmission rate is less than the packet transmission rate threshold.

15. The user device of claim 11, wherein the processing device is further configured to:
identify an additional WLAN; and
determine not to place the mobile telecommunications radio into the powered-up state if an additional signal strength associated with the additional WLAN is one or more of improving or exceeding a signal strength threshold.

16. The user device of claim 11, wherein the processing device is further configured to:
enable a first component of the mobile telecommunications radio in response to a first criterion being satisfied to place the mobile telecommunications radio into a partially powered state; and
enable a second component of the mobile telecommunications radio in response to a second criterion being satisfied to place the mobile telecommunications radio into a fully powered state.

17. The user device of claim 11, wherein the powered-down state comprises a partially powered state.

18. The user device of claim 11, wherein placing the second radio of the user device into the powered-down state based on the establishing of the wireless data connection with the wireless access point comprises:
determining whether a connection criterion associated with the wireless data connection with the wireless access point is satisfied; and
placing the second radio into the powered-down state in response to determining that the connection criterion is satisfied.

19. A non-transitory computer readable medium including instructions that, when executed by a processor, cause the processor to perform operations comprising:
placing, by the processor, a second radio of a user device into a powered-down state after a wireless connection has been established with a wireless communication system via a first radio of the user device, wherein the powered-down state comprises an unpowered state or a partially powered state in which at least one component of the second radio is unpowered;
determining, by the processor, whether to place the second radio into a powered-up state based on at least one criterion associated with the wireless connection; and
placing the second radio into the powered-up state responsive to determining that the at least one criterion is satisfied, wherein placing the second radio into the powered-up state comprises supplying power to the second radio without transferring the wireless connection to the second radio.

20. The non-transitory computer readable medium of claim 19, wherein the at least one criterion comprises a signal strength threshold, the operations further comprising:
transferring the wireless connection to the second radio after placing the second radio into the powered-up state.

21. The non-transitory computer readable medium of claim 20, wherein the at least one criterion further comprises a signal strength rate of change threshold, the operations further comprising:
computing a rate of change of the signal strength;
computing a direction of change of the signal strength; and
placing the second radio into the powered-up state if the signal strength is decreasing and the rate of change exceeds the signal strength rate of change threshold.

22. The non-transitory computer readable medium of claim 19, wherein the at least one criterion includes at least one of a packet loss rate threshold or a packet transmission rate threshold, the operations further comprising:
determining at least one of a packet loss rate for the connection or a packet transmission rate for the connection; and
placing the second radio into the powered-up state in response to one or more of determining that the packet loss rate is greater than a packet loss rate threshold or determining that the packet transmission rate is less than the packet transmission rate threshold.

23. The non-transitory computer readable medium of claim 19, wherein the wireless communication system is a wireless local area network, the operations further comprising:
identifying an additional wireless local area network; and
determining not to place the second radio into the powered-up state if an additional signal strength associated with the additional wireless local area network is one or more of improving or exceeding a signal strength threshold.

24. The non-transitory computer readable medium of claim 19, the operations further comprising:
- determining a historical connection time duration for wireless connections to the wireless communication system based on historical data;
- determining a duration that the user device has been connected to the wireless communication system; and
- determining whether to place the second radio into the powered-up state based on a comparison between the determined duration and the historical connection time duration.

25. The non-transitory computer readable medium of claim 19, the operations further comprising:
- determining a historical connection setup time for connections by the second radio to an additional wireless communication system at a current location of the user device; and
- determining when to place the second radio into the powered-up state based on the historical connection setup time.

26. The non-transitory computer readable medium of claim 19, the operations further comprising:
- enabling a first component of the second radio in response to a first criterion being satisfied to place the second radio into a partially powered state; and
- enabling a second component of the second radio in response to a second criterion being satisfied to place the second radio into a fully powered state.

27. The non-transitory computer readable medium of claim 19, wherein the first radio is a Wi-Fi radio and the second radio is a third generation mobile telecommunications (3G) radio or a fourth generation mobile telecommunications (4G) radio.

28. The non-transitory computer readable medium of claim 19, wherein placing the second radio of the user device into the powered-down state based on the establishing of the wireless data connection with the wireless access point comprises:
- determining whether a connection criterion associated with the wireless data connection with the wireless access point is satisfied; and
- placing the second radio into the powered-down state in response to determining that the connection criterion is satisfied.

* * * * *